United States Patent

Uchiki et al.

[11] Patent Number: 5,832,587
[45] Date of Patent: Nov. 10, 1998

[54] GASKET MOUNTING APPLIANCE AND A METHOD OF MOUNTING THE GASKET

[75] Inventors: Hirokazu Uchiki, Tokyo; Kunimitsu Uchiki, Shiki; Ichiro Osaki, Tokyo; Masateru Tachikawa, Asaka, all of Japan

[73] Assignee: Uchiki Glass Shokai Co., Ltd., Tokyo, Japan

[21] Appl. No.: 571,086

[22] Filed: Dec. 12, 1995

Related U.S. Application Data

[63] Continuation of Ser. No. 210,230, Mar. 17, 1994, abandoned.

[30] Foreign Application Priority Data

Mar. 19, 1993 [JP] Japan .................................. 5-085262
Nov. 22, 1993 [JP] Japan .................................. 5-315867

[51] Int. Cl.⁶ .............................. B32P 11/00; B32P 19/04
[52] U.S. Cl. .............................. 29/451; 29/235; 29/281.1; 29/822
[58] Field of Search .............................. 29/235, 450, 451, 29/281.1, 822

[56] References Cited

U.S. PATENT DOCUMENTS

2,152,569  8/1939  Bright .
5,179,774  1/1993  Massie ...................................... 29/451

Primary Examiner—S. Thomas Hughes
Attorney, Agent, or Firm—Rudnick & Wolfe

[57] ABSTRACT

A gasket securing device of a gasket mounting appliance is movable in its radius direction, capable of being put into an opening disposed in an object after mounting a ribbonlike gasket in its backward position, and, in its forward position, capable of pressing predetermined parts of the gasket against and fitting them into respective predetermined parts of an engaging portion prepared along the margin of the opening and, thereafter, pressing the rest of the gasket that lies between the fitted predetermined parts against and fitting it into the rest of the engaging portion.

8 Claims, 12 Drawing Sheets

GASKET MOUNTING APPLIANCE AND A METHOD OF MOUNTING THE GASKET

This is a continuation of copending application Ser. No. 08/210,230 filed on Mar. 17, 1994, now abandoned.

BACKGROUND OF THE INVENTION

1. Field of the Invention

This invention relates to a gasket mounting appliance and a method of mounting a ribbon-like gasket and is engaged with an engaging portion prepared along the margin of an opening of an object.

2. Description of the Related Art

Figure 13:
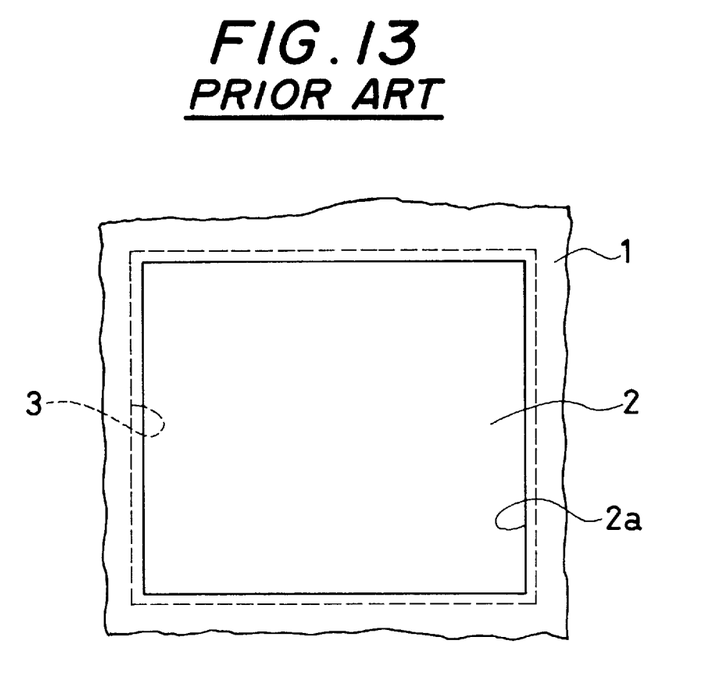
FIG. 13 is a front view of an opening disposed in a construction.
Figure 14:
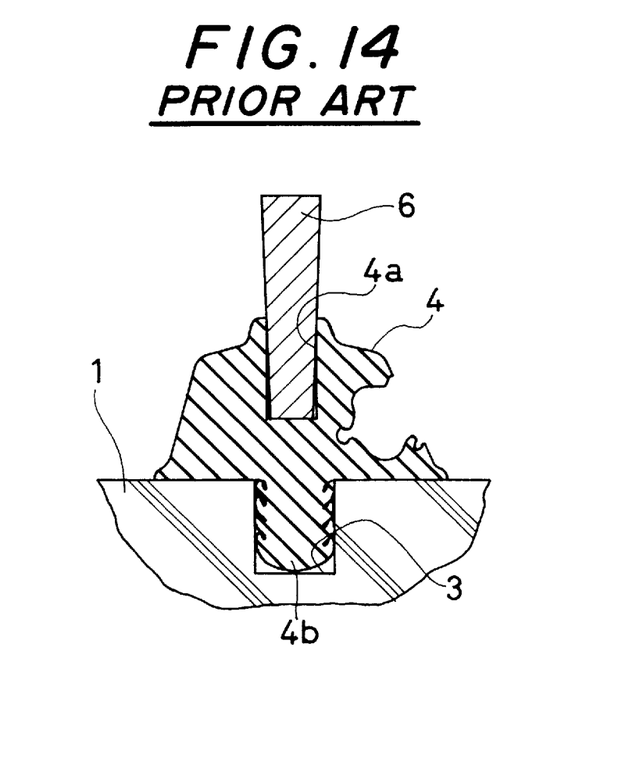
FIG. 14 is a sectional view of a previously proposed gasket mounting appliance.

As shown in FIG. 13, a groove 3 indicated in dotted line is disposed along the margin 2a of an opening 2, such as a window, of a concrete construction 1. Groove 3 receives a projection 4b of a ribbonlike gasket 4 as shown in FIG. 14, and a window pane is fitted into a groove 4a prepared in the gasket 4.

In that event, the working of fitting the projection 4b into the groove 3 has been manually made so far. That is, a wedge 6 shown in FIG. 14 is inserted into the groove 4a of the gasket 4 and struck with a hammer. Therefore, many working hours are required. In addition, it is very troublesome to workers and very dangerous for the workers.

OBJECT AND SUMMARY OF THE INVENTION

Accordingly, it is an object of the present invention to provide a gasket mounting appliance and a method of mounting the gasket, in which the working is mechanized in order to avoid the previously described disadvantages of the prior art.

In accordance with one aspect of this invention, in a gasket mounting appliance for making a ribbonlike gasket engage with an engaging portion prepared along the margin of an opening disposed in an object, the appliance has gasket securing means that is movable in its radius direction, that can be put into the opening after the gasket has been mounted thereon in its backward position, and that is capable of pressing the gasket against and fitting it into the engaging portion in its forward position.

In a preferred embodiment of this invention, the gasket securing means comprises first securing means for pressing predetermined parts of the gasket against and fitting them into respective predetermined parts of the engaging portion, and second securing means for pressing the rest of the gasket that lies between the fitted predetermined parts against and fitting it into the rest of the engaging portion.

In accordance with another aspect of this invention, a method of mounting a ribbon-like gasket, with an engaging portion prepared along the margin of an opening disposed in an object, comprising the steps of: moving gasket securing means radially to its backward position, wherein the ribbonlike gasket is mounted on the gasket securing means along the periphery thereof; putting the gasket securing means, on which the gasket has been mounted, into the opening of the object; moving the gasket securing means radially to its forward position, wherein the gasket is pressed against and fitted into the engaging portion of the opening; moving the gasket securing means radially to its backward position, whereby the gasket securing means is separated from the gasket; and moving the gasket securing means out of the opening of the object.

DETAILED DESCRIPTION OF PREFERRED EMBODIMENTS

On reference to FIGS. 1–9, a first embodiment of a gasket mounting appliance for mounting a gasket on a rectangular opening, such as a window, of a concrete construction will be hereinafter described in detail. In the following description, if any members are the same ones that were shown in FIGS. 13 and 14, the same reference numerals will be used therefor and the explanation thereof will be omitted.

Figure 1:
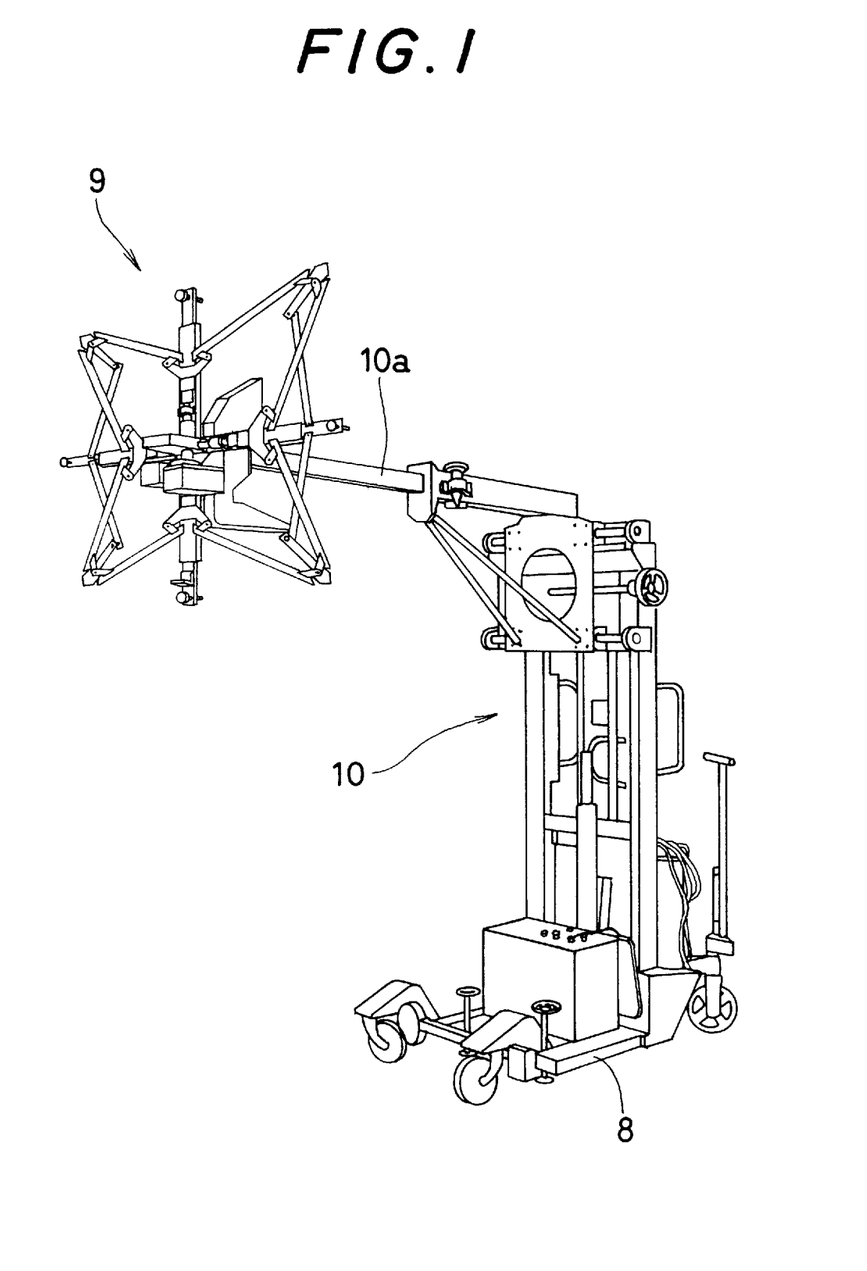
FIG. 1 is a perspective view of a gasket mounting appliance according to an embodiment of this invention.

As shown in FIG. 1, the gasket mounting appliance is freely movable due to its truck portion 8 and, on the truck portion 8, there is a transferring device 10 for moving the gasket securing device 9 freely in three dimensional directions. The gasket securing device 9 is secured to the transferring device 10 through an arm 10a that projects from the transferring device 10 and is expansible and contractible in back and forth directions.

Figure 2:
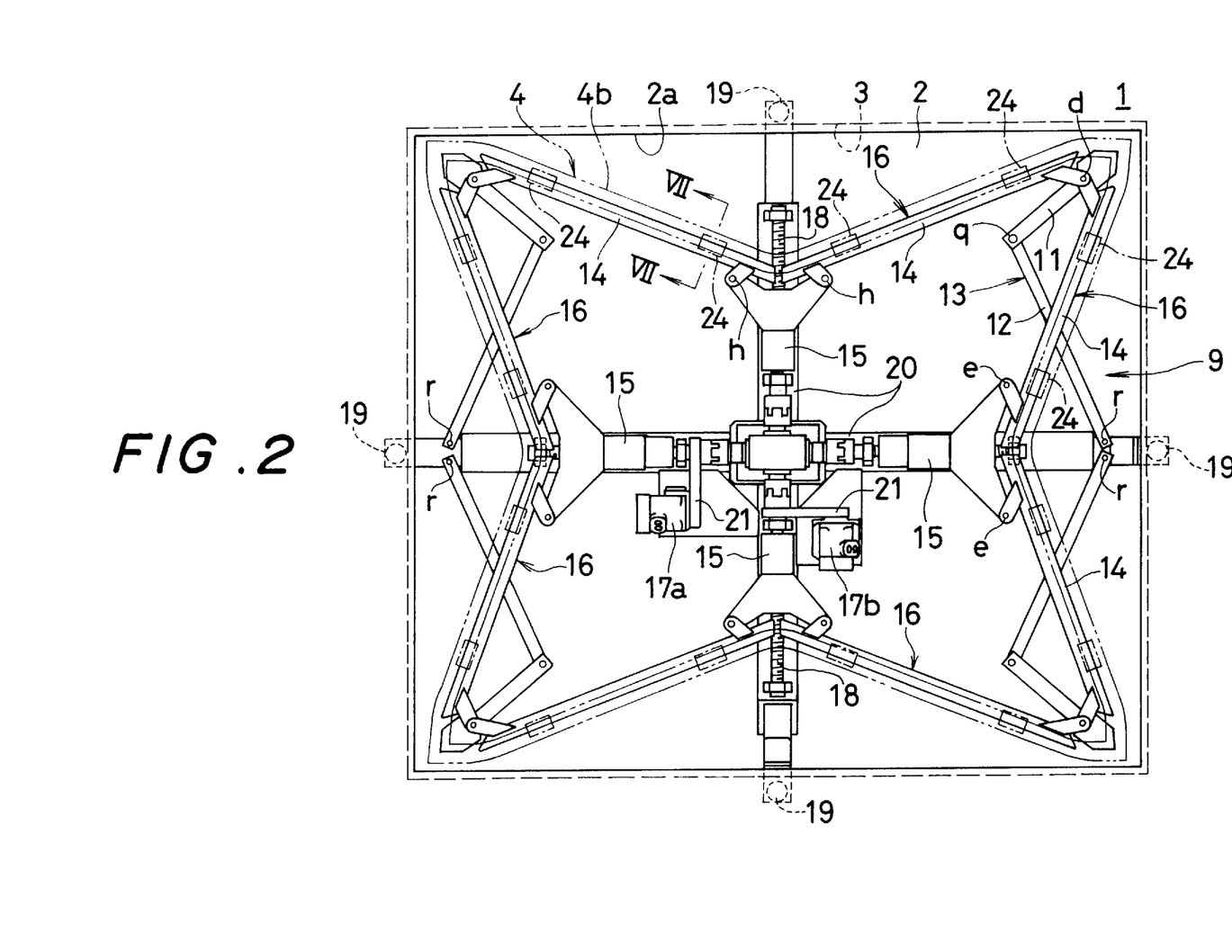
FIG. 2 is a plan view of the gasket securing device appearing on FIG. 1 and located in its backward position.
Figure 3:
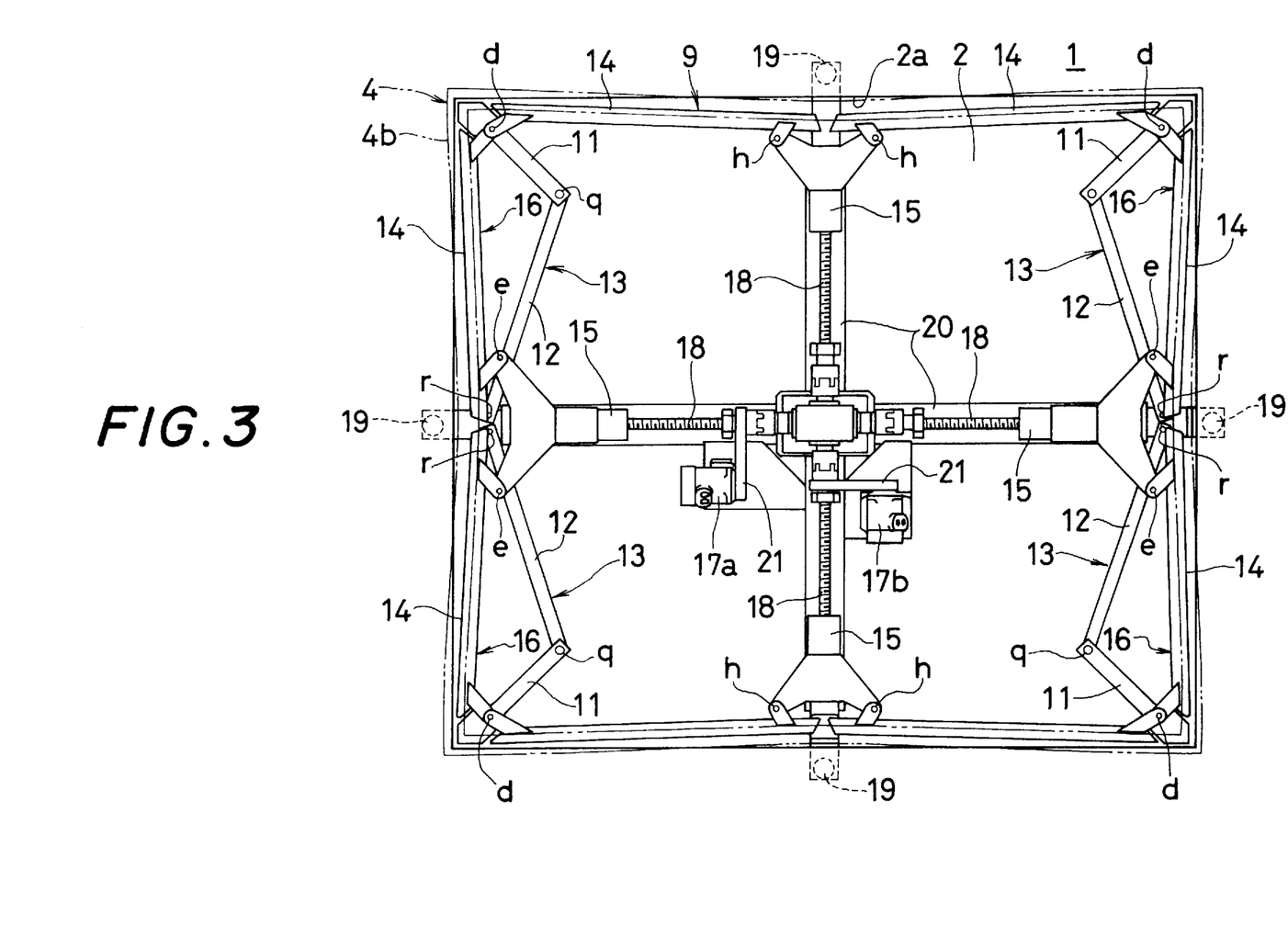
FIG. 3 is a plan view of the gasket securing device of FIG. 2, when located in its forward position to make four parts of the gasket engage with the four corresponding corners of a rectangular opening.
Figure 4:
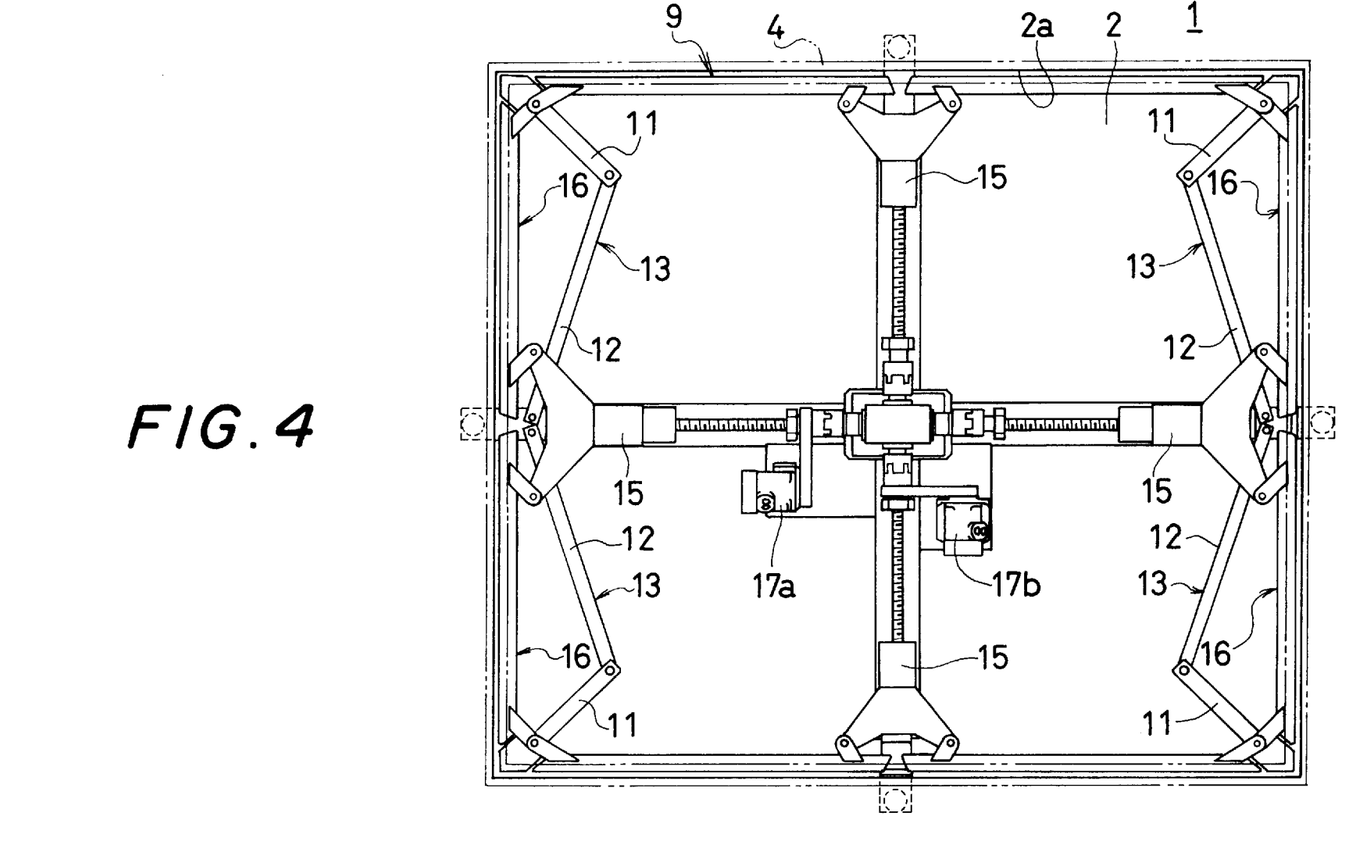
FIG. 4 is a plan view of the gasket securing device of FIG. 3, when located in its forward portion to make the gasket except the four parts thereof engage with the corresponding edge of the opening except the four corners thereof.
Figure 5:
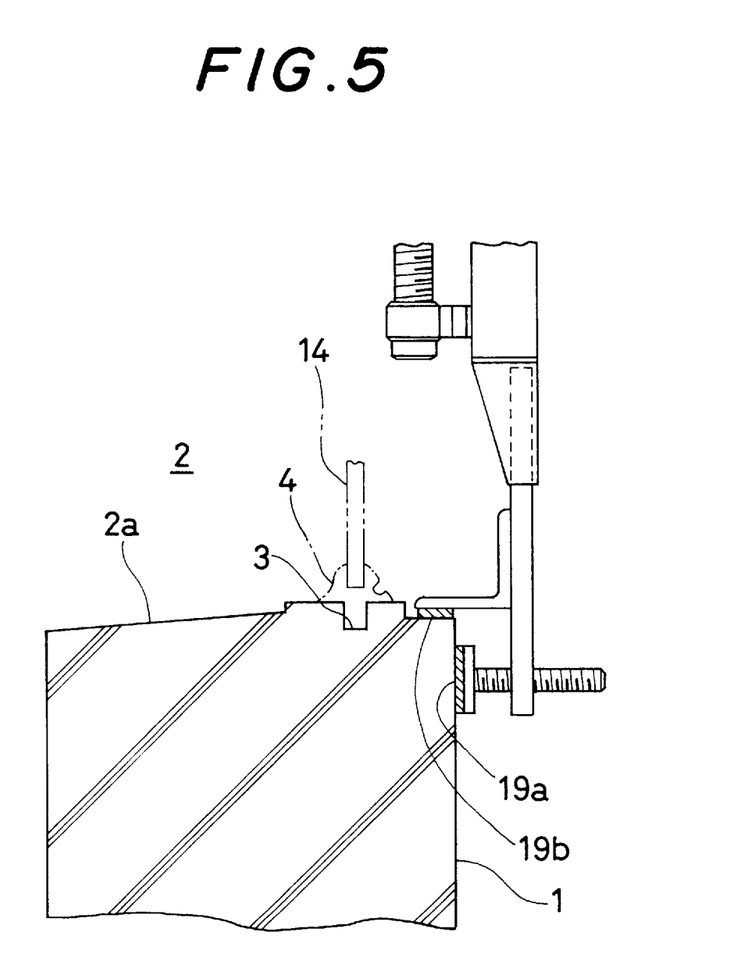
FIG. 5 is a side view of a positioning device.

Shown in FIGS. 2–4 are three aspects of the gasket securing device 9: one aspect shown in FIG. 2, in which the device 9 is contracted to be enabled to put into the opening 2; another aspect shown in FIG. 3, in which the device 9 is partly pressed against the margin 2a of the opening 2; and another aspect shown in FIG. 4, in which the device 9a is pressed in whole against the margin 2a of the opening 2.

The gasket securing device 9 comprises four first securing devices 13 and four second securing devices 16. The first securing device 13 has a corner part securing member 11 and a rotating member 12, one end of which is secured to an immovable point r of the device 9 and the other end of which is connected to one end of the corner part securing member 11 at point q. The second securing device 16 has a reciprocating member 15 and a pair of side part securing members 14. One end of the side part securing member 14 is connected to the reciprocating member 15 at points e and h and the other end is connected to the corner part securing member 11 at point d that is present at the other end thereof.

The immovable point r of the device 9 is placed near the end of the horizontal center line of the opening 2 as shown in FIG. 2, and point d in the corner part securing member 11 moves substantially along the diagonal of the opening 2.

The four second securing devices 16 face the four sides of the rectangular opening 2, respectively. The reciprocating member 15 of each second securing device 16 is placed on the centerline of the opening 2 as shown in FIG. 2 and is movable on one of a pair of rail members 20 that are perpendicular to each other. Further, the two reciprocating members 15 movable on the same rail member 20 are driven by the same hydraulic motor 17a, 17b through a feed screw 18 and a belt 21.

Disposed at the four ends of the pair of the rail members 20 are positioning devices 19, respectively. The positioning device 19 serves to guide the gasket securing device 9, lest the device 9 should be brought into contact with the margin 2a of the opening 2 when the contracted device 9 is put into the opening 2. The two of the four positioning devices 19, situated opposite to the right side part and the lower side part of the margin 2a in FIGS. 2–4, have each a first surface 19a shown in FIG. 5, which is to be brought into contact with a surface of the concrete construction 1, and a second surface 19b, which is perpendicular to the first surface 19a and to be brought into contact with the margin 2a of the opening 2.

Figure 6A:
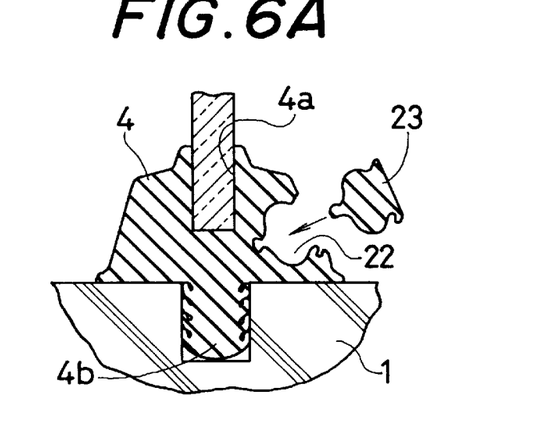
FIG. 6A is a sectional view of a gasket.

The ribbonlike gasket 4, which is secured to the margin 2a of the opening 2 of the concrete construction 1, has a section shown in FIG. 6A. Disposed on the right side part of the gasket 4 in FIG. 6A is a groove 22 that extends along the longitudinal direction of the ribbonlike gasket 4, in which a ribbonlike filler 23 can be fitted.

Figure 6B:
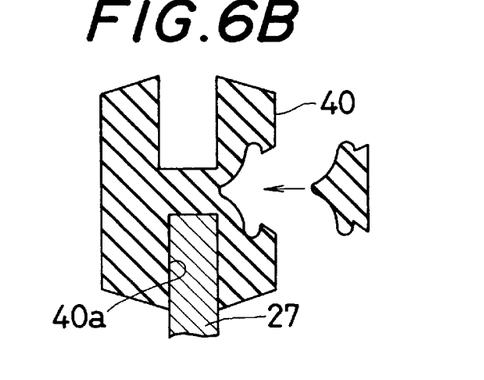
FIG. 6B is a sectional view of another gasket.

The ribbonlike gasket 4 may have a section shown in FIG. 6B. In the ribbonlike gasket 40 having the H-shaped section shown in FIG. 6B, a projection 27 is prepared in lieu of the groove 3 along the margin 2a of the opening 2, and the gasket 40 is mounted on the projection 27.

In the meantime, when the gasket 4 is to be secured to the margin 2a of the opening 2 with the help of the above-mentioned gasket mounting appliance, the gasket securing device 9 is, firstly, contracted as shown in FIG. 2. That is, the motors 17a and 17b are started to retreat the four reciprocating members 15 toward the center of the gasket securing device 9 by a predetermined distance.

Figure 7:
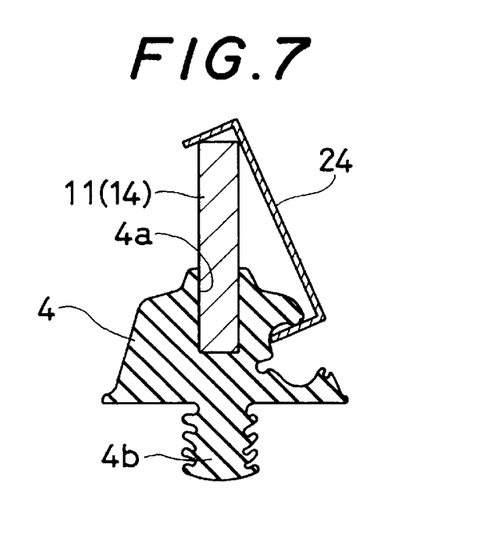
FIG. 7 is a sectional view taken along the line VII—VII on FIG. 2.

Then, the gasket 4 is secured to the gasket securing device 9 along the periphery thereof. That is, the platelike corner part securing member 11 and the platelike side part securing member 14 are fitted into the groove 4a of the gasket 4 as shown in FIG. 7. At that time, an illustrated clip 24 may be used to prevent the gasket 4 from separating from the gasket securing device 9.

Thereafter, the truck portion 8 is moved and the transferring device 10 and arm 10a are operated in order to put the gasket securing device 9 into the opening 2. In that event, the gasket securing device 9 is located in a suitable position with the help of the positioning device 19.

The motors 17a and 17b are then started to advance the reciprocating members 15 and, as the result, a part of the gasket 4, which has been secured to the corner part securing member 11, is pressed against the corner of the rectangular opening 2 as shown in FIG. 3. Thus, a part of the ribbonlike projection 4b of the gasket 4, which corresponds to the corner part of the gasket, is fitted into the groove 3 by the first securing device 13.

Subsequently, the rest of the gasket 4, which has been secured to the side part securing member 14, is fitted into the groove 3 by the second securing device 16 as shown in FIG. 4.

Thereafter, the clip 24 is disengaged and the gasket securing device 9 is retreated to be separated from the gasket 4.

Then, the truck portion 8, transferring device 10 and arm 10a are operated to take out the contracted device 9 from the opening 2 to complete the mounting of gasket 4. Thereafter, the windowpane is fitted into the groove 4a and, so as to prevent the windowpane from coming out of the groove 4a, the filler 23 is fitted into the groove 22.

Now, the link mechanism of the gasket securing device 9 will be described on reference to FIGS. 8 and 9. It may be recognized that the two side part securing members 14 that are present in the upper right corner in FIG. 2, and connected to each other at point d, are such members as to be fixedly secured to links L and M (FIG. 8), whose ends are denoted by d, e and d, h, respectively.

Figure 8:
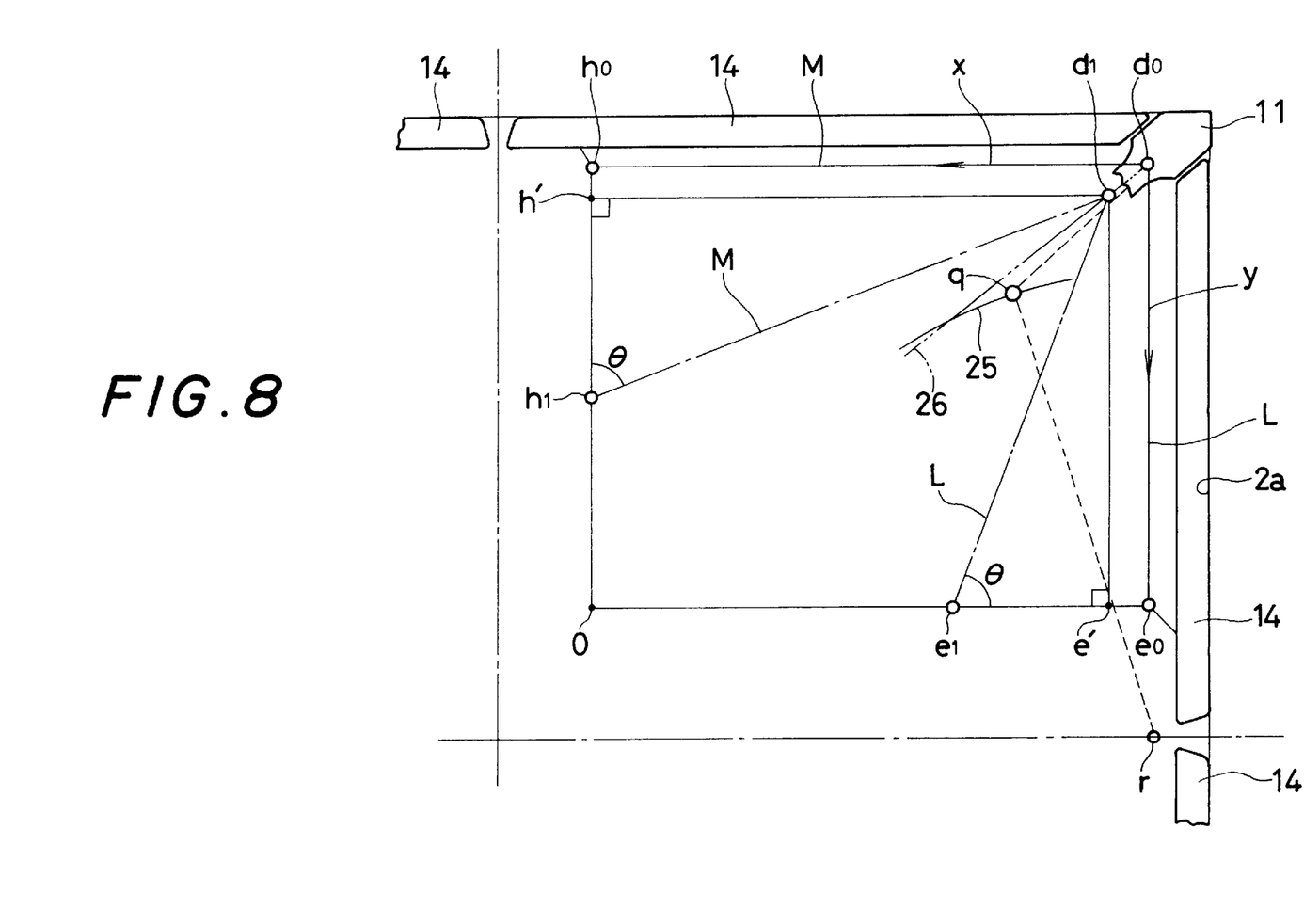
FIG. 8 is a schematic of the link assembly constituting the gasket securing device of FIG. 2.

In FIG. 3, draw lines $\overline{eO'}$ and $\overline{hO'}$ in parallel with the respective rail members 20 and denote a point, at which the lines cross, by O' (see FIG. 8). When the second securing device 16 is in the positions shown in FIGS. 4 and 2, denote point d by $d_0$ and $d_1$, point e by $e_0$ and $e_1$, and point h by $h_0$ and $h_1$ as shown in FIG. 8, respectively. Draw lines $\overline{d_1e'}$ and $\overline{d_1h'}$ that are perpendicular to the respective lines $\overline{eO'}$ and $\overline{hO'}$ and denote the feet of the respective perpendiculars by e' and h'.

In FIG. 8, if the common end of links L and M is positioned at point $d_1$, points $e_1$ and $h_1$ are positioned on lines $\overline{e_0O'}$ and $\overline{h_0O'}$ and, then, links L and M are indicated in chain-dotted lines, respectively. The points $d_0$, $d_1$ and O' may be regarded as being substantially on a straight line.

Thus, $$\frac{\overline{d_0e_0}}{d_1e'} = \frac{\overline{d_0h_0}}{d_1h'}$$

$$\therefore \frac{L}{d_1e'} = \frac{M}{d_1h'}$$

The lengths of hypotenuses $\overline{d_1e_1}$ and $\overline{d_1h_1}$ of two right-angled triangles $d_1e_1e'$ and $d_1h_1h'$ are L and M, respectively. Thus, $$\Delta d_1e_1e' \sim \Delta d_1h_1h'$$

$$\therefore \angle d_1e_1e' = \angle d_1h_1h' = \theta$$

That is, the links L and M are moved under such condition that the above angles are always equal to each other.

Furthermore, $$\overline{d_1e'} = L \sin \theta, \ \overline{d_1h'} = M \sin \theta$$

If coordinate axes x and y are defined as shown in FIG. 8, the distance between points $d_0$ and $d_1$ is given by, $$x = M(1 - \sin \theta), \ y = L(1 - \sin \theta)$$

Figure 9:
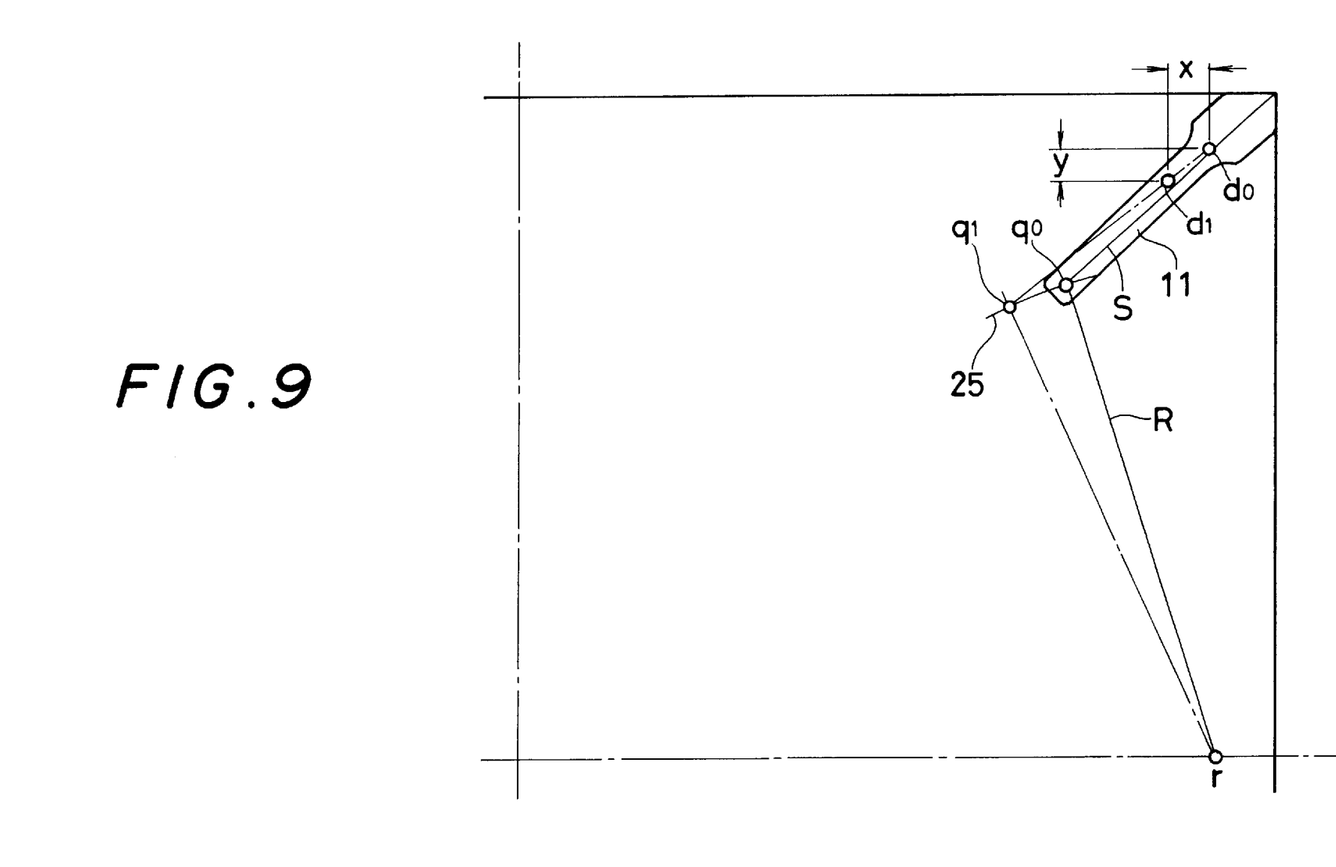
FIG. 9 is another schematic of the link assembly of FIG. 8.

As shown in FIG. 9, denote the rotating member 12 shown in FIGS. 2 and 4 by link R, and assume the ends of link S are denoted by d and q. Then, the locus 25 of the end q forms a circle with center r and radius R as shown in FIG. 8, and the locus 26 of the end d is indicated in a chain line with two dots in FIG. 8. Thus, the ends of the link S move on the lines 25 and 26, respectively.

In the illustrated embodiment, the opening 2 is of a rectangular shape, whose horizontal side is larger. Therefore, M is greater than L.

According to FIG. 8, length $\overline{O'e_1}$ is given by, $$\overline{O'e_1} = M \sin\theta - L\cos\theta \qquad (1)$$

Length $\overline{O'h_1}$ is given by, $$\overline{O'h_1} = L\sin\theta - M\cos\theta$$

Thus, $$\overline{O'e_1} - \overline{O'h_1}(M-L)(\sin\theta + \cos\theta) > 0$$

That is, when the gasket securing device 9 is contracted, the reciprocating member 15 that moves in the vertical direction in FIG. 2 reaches its contraction limit earlier than the reciprocating member 15 that moves in the horizontal direction in FIG. 2.

On reference to FIG. 10, a second embodiment will be hereinafter described in order to realize that the latter reciprocating member 15 reaches its contraction limit soon after the former reciprocating member 15 does. According to the second embodiment, the usable range of the gasket securing device 9 will be enlarged.

Figure 10:
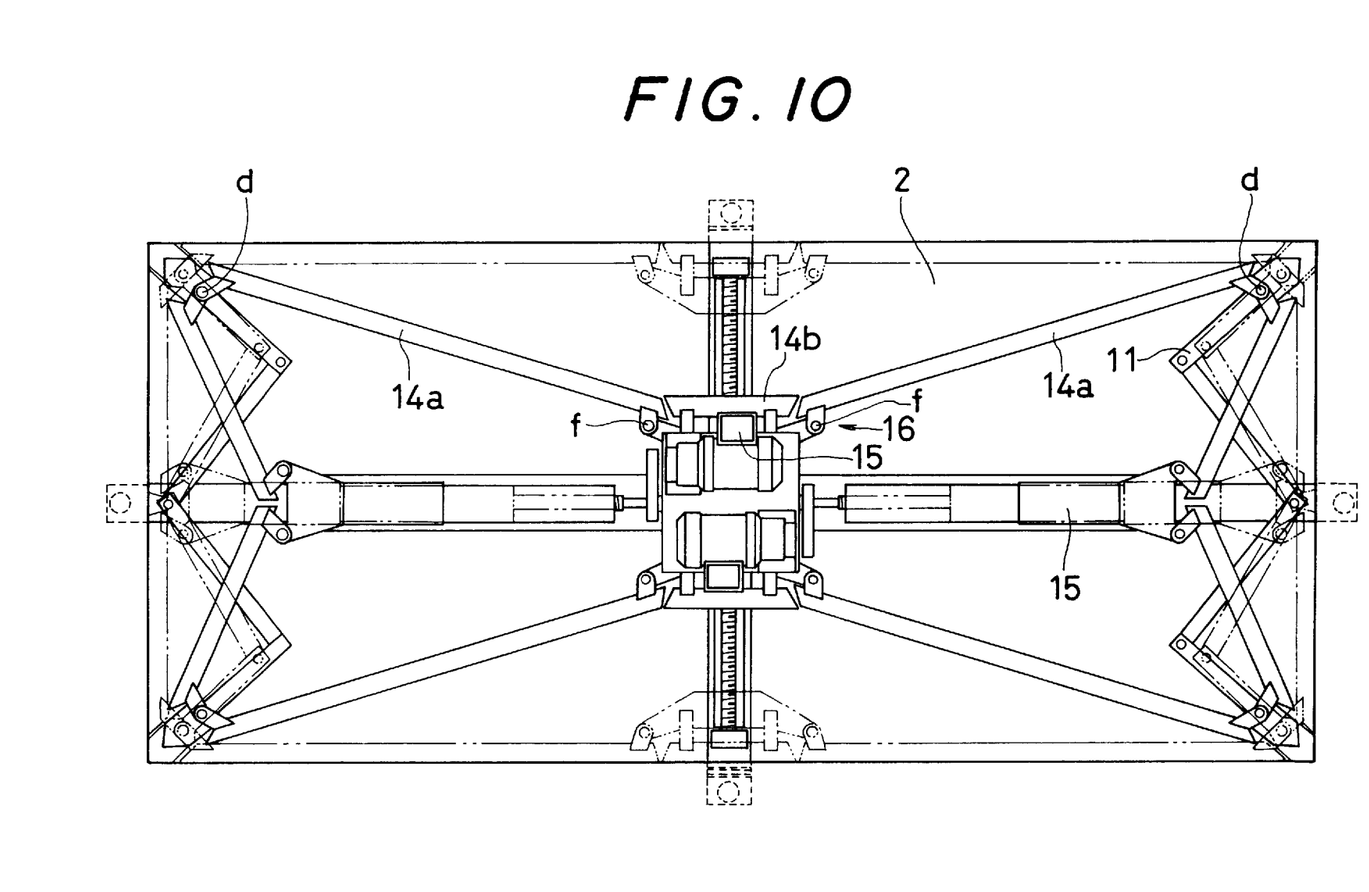
FIG. 10 is a plan view of another gasket securing device embodying this invention.

As shown in FIG. 10, the pair of the side part securing members 14 shown in FIG. 2, which faces the longer side of the opening 2, is replaced by a pair of rotatable members 14*a*, each of which is rotatable on point d that is present in the corner part securing member 11, and a translationally movable member 14*b* that connects both the free ends of the pair of the rotating members 14*a*. The translationally movable member 14*b* is fixed to the reciprocating member 15 so as to be movable together therewith.

Figure 11:
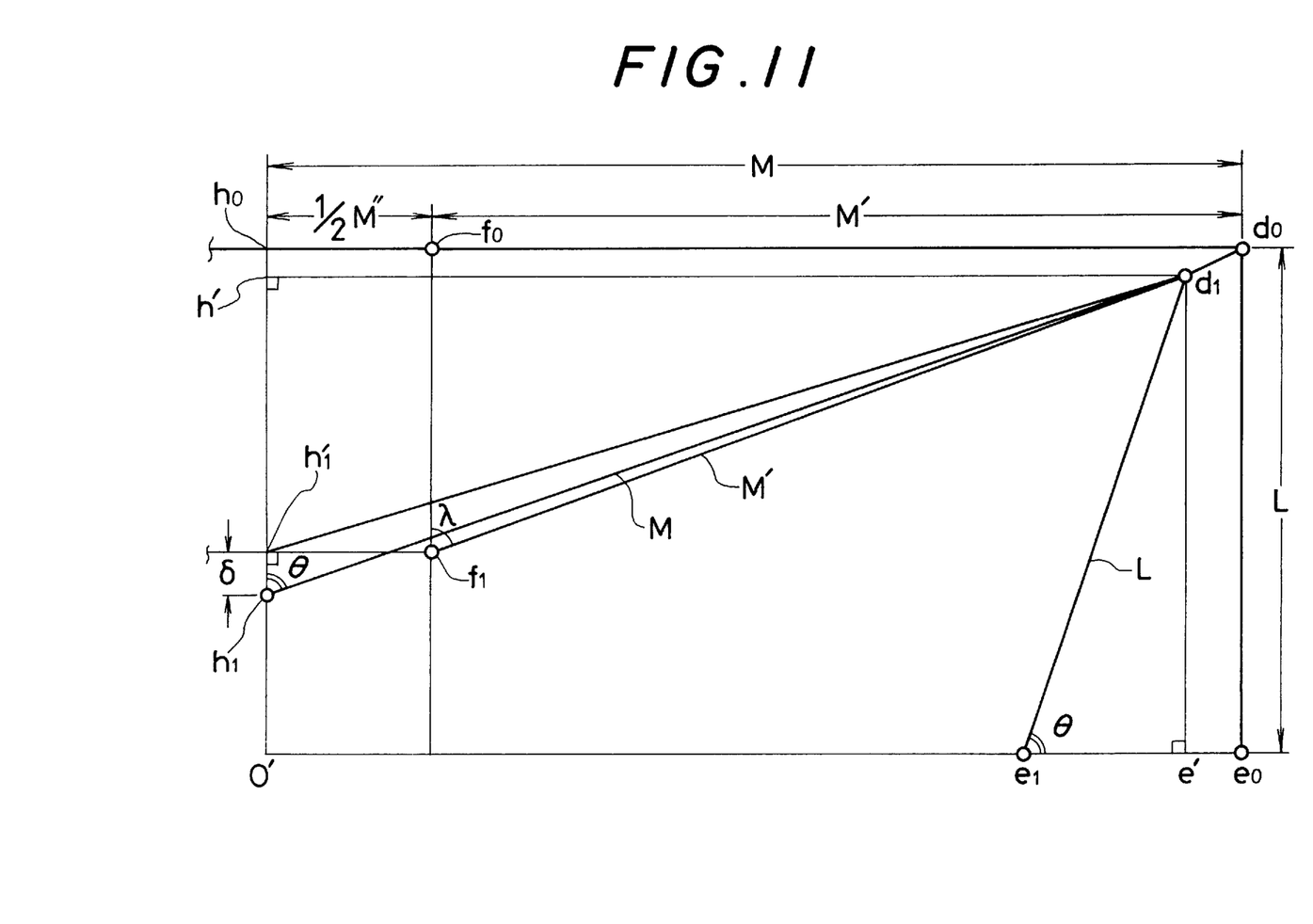
FIG. 11 is a schematic of the link assembly constituting the gasket securing device of FIG. 10.

As shown in FIG. 11 that corresponds to FIG. 8, denote the rotatable member 14*a* by link M' and denote the translationally movable member 14*b* by link M" in the same way as is done in FIG. 8. Then, if the link M' is made to rotate through angle λ as shown in FIG. 11 when the links M, L shown in FIG. 8 are made to rotate through angle θ, triangle $d_1h'_1f_1$ is formed, and the three sides of the triangle have the following relationship:

$$M' + 1/2 M'' = M > \overline{d_1 h'_1}$$

From the foregoing, the end $h_1$ of the link M is always located nearer to point O' than point $h'_1$. In other words, if the side part securing member is constituted according to the second embodiment, the reciprocating member 15 according to the second embodiment reaches its contraction limit later than the reciprocating member 15 according to the first embodiment would.

Difference δ shown in FIG. 11 is given by:

$$\delta = \overline{O'h'_1} - \overline{O'h_1}$$

where $$\overline{O'h'_1} = L\sin\theta - M'\cos\lambda \qquad (2)$$

$$\overline{O'h_1} = L\sin\theta - M\cos\theta \qquad (3)$$

$$\therefore \delta = M\cos\theta - M'\cos\lambda \qquad (4)$$

According to FIG. 11, $$\frac{M'\sin\lambda + 1/2 M''}{M} = \frac{L\sin\theta}{L}$$

and, $$1/2 M'' = (M - M')$$

$$\therefore M'(1-\sin\lambda) = M(1-\sin\theta) \qquad (5)$$

From eq. (4) and (5), $$\delta = M \times \frac{\sin(\theta-\lambda) + \cos\theta - \cos\lambda}{1 - \sin\lambda} \qquad (6)$$

In eq. (6), value λ can fittingly be selected so as to make value δ larger. In other words, if the side part securing member is constituted according to the second embodiment, the contraction limit of the securing device 13, 16 is defined dependently on the reciprocating member 15 that moves in the vertical direction in FIG. 10.

In the second embodiment, the contraction limit of the securing device 13, 16 occurs when link M' aligns with link L. Thus, $$\lambda + \theta = 90° \qquad (7)$$

Figure 12:
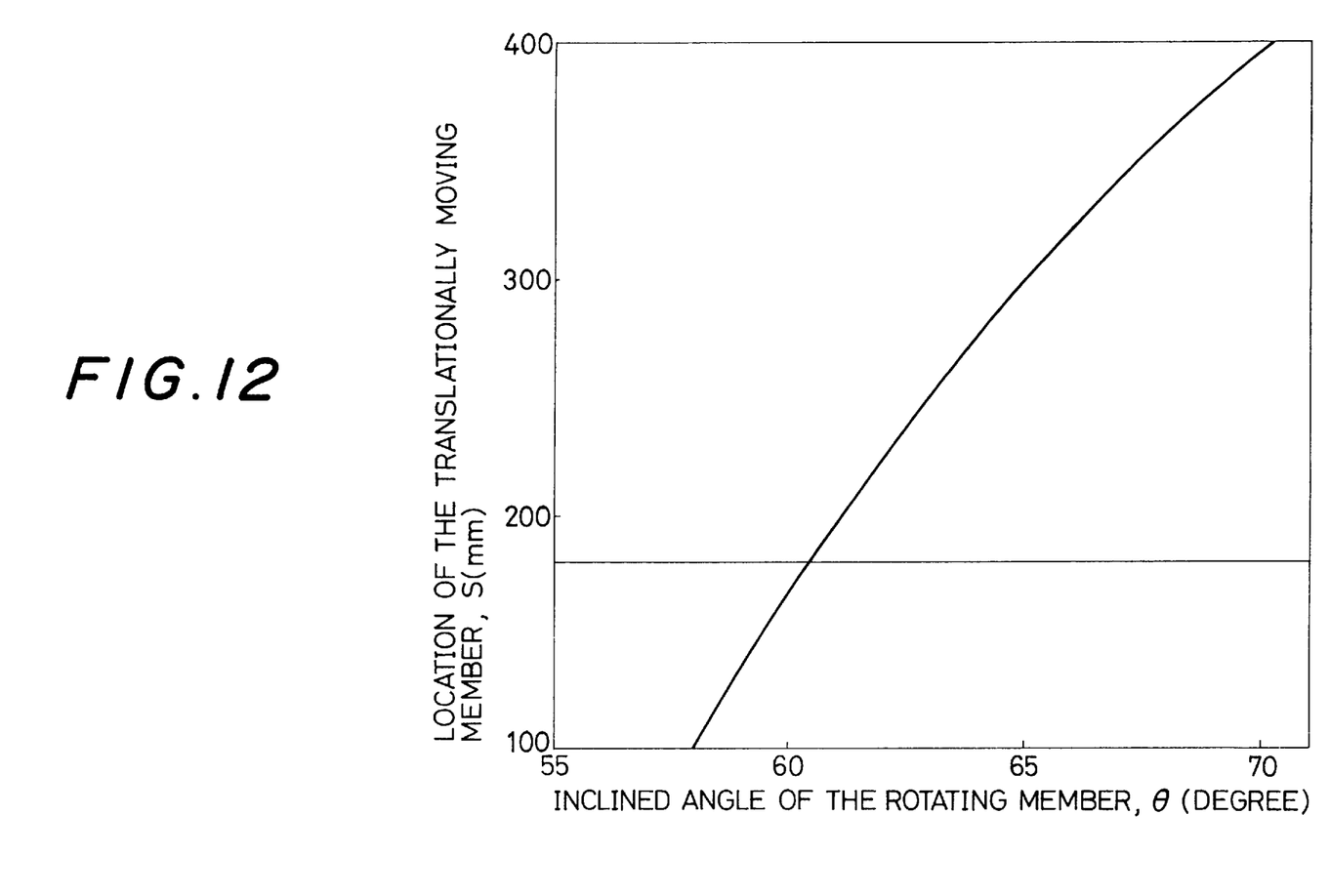
FIG. 12 is a graphical representation of a S-θ relationship present in the gasket securing device of FIG. 10.

For example, assume L is 540 mm, M is 1300 mm and the contraction limit of the reciprocating member is 180 mm. Reciprocating member 15 is vertically movable in FIG. 10 and is represented, in FIG. 11, by a distance from point 0', segments O'h'1. Then, the length of link M' is given as follows:

FIG. 12 is a graph illustrating the relationship between angle θ and segment $O'h'_1$(=S) which is derived from eq. (2), eq. (5) and eq. (7).

From FIG. 12, when S=180, angle θ is given by:

$$\theta \approx 60.5°$$

From eq. (7), $$\lambda = 29.5°$$

From eq. (5), $$M' = 332 \text{ mm}$$

Thus, $$1/2\ M'' = 968 \text{ mm}$$

Further, the length of segment $O'e_1$ derived from eq. (1) is:

$$\overline{O'e_1} \approx 865 \text{ mm}$$

The value of 865 mm is much larger than the contraction limit, 180 mm.

In the appliance according to the first embodiment, the contraction limit obtained by using eq. (3) and represented by angle θ is:

$$\theta \approx 75.2°$$

Thus, the contraction limit of the appliance according to the second embodiment is smaller in angle θ than that of the appliance according to the first embodiment by about 15°.

Having described an illustrative embodiment of this invention with reference to the accompanying drawings, it is to be understood the invention is not limited to that precise embodiment, and that various modifications are possible within a scope of the appended claims. For example, the opening 2 may be of square shape, circular shape, elliptical shape, trapezoidal shape or triangular shape. If the margin of the opening is curved, the side part securing member is formed to be curved.

In the second embodiment, the pair of the second securing devices 16, each of which faces the longer side of the opening 2, comprises the rotating member 14*a* and the parallel translation member 14*b*, respectively. However, all four, only one or only three second securing devices 16 may comprise these members.

Moreover, a slate or a metal plate, such as an aluminum plate, may be fitted in the gasket instead of a glass plate. Further, the glass plate or the like may be fixedly fitted into the framework, or movable sashes may be fitted therein.

Furthermore, the reciprocating member 15 may be driven by an electric instead of a hydraulic motor. Further, the reciprocating member 15 may be reciprocated by another reciprocating means.

In the embodiment, the invention is applied to the gasket that is secured to the built-in wall of the building, but it may be applied to gaskets secured to openings of a unit construction made of precast concrete, or metal.

What is claimed is:

1. Apparatus for mounting a ribbon-like gasket in a rectangular engaging portion defined along the margin of a rectangular opening disposed in an object, comprising:
    a) gasket securing means for mounting the gasket in a backward position, said gasket securing means being movable in a radial direction to a forward position to fit the gasket within said engaging portion;
    b) truck means for moving said gasket securing means into the rectangular opening; and
    c) drive means for driving said gasket securing means to said forward position;
    wherein said drive means comprise:
        a) a pair of rail members perpendicular to each other, one of said rail members extending vertically and the other of said rail members extending horizontally;
        b) a first pair of reciprocating members mounted on the horizontal one of said rail members and an additional pair of reciprocating members mounted on the vertical one of said rail members, and
        c) a first motor for reciprocating said first pair of reciprocating members; and a second motor for reciprocating said additional pair of reciprocating members;
    said gasket securing means comprising:
        a) four first securing devices each having a corner part securing member for mounting the corners of the gasket, and a plurality of pivoting link means, one of said pivoting link means extending between each of said first pair of reciprocating members and said first securing devices whereby operation of said first pair of reciprocating members operates to fit the corners of the gasket within said engaging portion; and
        b) four second securing devices each having a side part securing member for mounting the side portions of the gasket extending between said corners of the gasket, and means connecting said additional pair of reciprocating members to said second securing devices whereby operation of said additional pair of reciprocating members operates to fit said side portions of the gasket within said engaging portion.

2. The apparatus of claim 1 wherein said gasket securing means includes four corner part securing members and eight side part securing members, each of said corner part securing members having two of said side part securing members rotatably attached thereto.

3. The apparatus of claim 1 including means operating said first securing means responsive to said first pair of reciprocating members to drive each of said corner part securing members into the corners of said engaging portion, and means operating said second securing means responsive to said additional pair of reciprocating members to thereafter drive each of the side part securing members into the remainder of the engaging portion.

4. The apparatus of claim 1 wherein said engaging portion comprises a rectangular groove.

5. Apparatus according to claim 1 including a first pivot attachment on each of said corner part securing members, a second pivot attachment on each of said first pair of reciprocating members, each of said pivoting link means having one end attached to said first pivot attachment and the other end to said second pivot attachment, said side part securing members each being pivotally connected at one end to a corner part and at the other end to an additional reciprocating member, said first motor being set to operate at a different speed than said second motor, the distance between said first pivot attachment and the point of attachment of a side part securing member to an additional reciprocating member being different than the distance between the first and second pivot attachments for said pivoting link means, and wherein the operating speed ratio between said first motor and said second motor is equal to the ratio of said distance between said first pivot attachment and the point of attachment of a side part securing member to an additional reciprocating member, and said distance between the first and second pivot attachments for each said pivoting link means.

6. Apparatus according to claim 1 including a pair of additional side part securing members having a predetermined length, one of said additional side part securing members being fixed to each one of said additional reciprocating members at a location between said first mentioned side part securing members connected to the respective additional reciprocating members.

7. A method for mounting a ribbon-like gasket in a rectangular engaging portion comprising corner engaging portions and side engaging portions defined along the margin of a rectangular opening disposed in an object, comprising providing a mounting apparatus consisting of:
    a) gasket securing means for mounting the gasket in a backward position, said gasket securing means being movable in a radial direction to a forward position to fit the gasket within said engaging portion;
    b) truck means for moving said gasket securing means into the rectangular opening; and
    c) drive means for driving said gasket securing means to said forward position;
    wherein said drive means comprise:
        a) a pair of rail members perpendicular to each other, one of said rail members extending vertically and the other of said rail members extending horizontally;
        b) a first pair of reciprocating members mounted on the horizontal one of said rail members and an additional pair of reciprocating members mounted on the vertical one of said rail members, and
        c) a first motor for reciprocating said first pair of reciprocating members; and a second motor for reciprocating said additional pair of reciprocating members;
    said gasket securing means comprising:
        a) four first securing devices each having a corner part securing member for mounting the corners of the gasket, and a plurality of pivoting link means, one of said pivoting link means extending between each of said first pair of reciprocating members and said first securing devices whereby operation of said first pair of reciprocating members operates to fit the corners of the gasket within said engaging portion; and
        b) four second securing devices each having a side part securing member for mounting the side portions of the gasket extending between said corners of the gasket, and means connecting said additional pair of reciprocating members to said second securing devices whereby operation of said additional pair of reciprocating members operates to fit said side portions of the gasket within said engaging portion, said method comprising the steps of operating said first securing means by moving said first pair of reciprocating members toward said rectangular engaging portion to drive each of said corner part securing members into the corners of said engaging portion to mount the gasket within said corner engaging portions, and operating said second securing means by thereafter moving said additional pair of reciprocating members toward said engaging portion to thereafter drive each of the side part securing members into the remainder of the engaging portion to mount the gasket within said side engaging portions.

8. A method according to claim 7 wherein said mounting apparatus includes a first pivot attachment on each of said corner part securing members, a second pivot attachment on each of said first pair of reciprocating members, each of said pivoting link means having one end attached to said first pivot attachment and the other end to said second pivot attachment, said side part securing members each being pivotally connected at one end to a corner part and at the other end to an additional reciprocating member, means for controlling the speed of said motors independently of each other, the distance between said first pivot attachment and the point of attachment of a side part securing member to an additional reciprocating member being different than the distance between the first and second pivot attachments for said pivoting link means, and including the step of controlling the operating speed ratio between said first motor and said second motor so that the speed ratio thereof is equal to the ratio of said distance between said first pivot attachment and the point of attachment of a side part securing member to an additional reciprocating member, and said distance between the first and second pivot attachments for each said pivoting link means.

* * * * *